(12) United States Patent
Pantigny et al.

(10) Patent No.: US 7,060,956 B2
(45) Date of Patent: Jun. 13, 2006

(54) DEVICE FOR CONVERTING A PHOTOSIGNAL INTO A VOLTAGE IN IMAGE SENSORS WITH REMOTE INTEGRATORS

(75) Inventors: Philippe Pantigny, Claix (FR); Patrick Audebert, Varces (FR); Eric Mottin, Saint Martin le Vinoux (FR); Frédéric Rothan, Seyssinet (FR)

(73) Assignee: Commissariat a l'Energie Atomique, Paris (FR)

( * ) Notice: Subject to any disclaimer, the term of this patent is extended or adjusted under 35 U.S.C. 154(b) by 795 days.

(21) Appl. No.: 09/826,040

(22) Filed: Apr. 5, 2001

(65) Prior Publication Data

US 2001/0048065 A1    Dec. 6, 2001

(30) Foreign Application Priority Data

Apr. 10, 2000   (FR) .................................. 00 04562

(51) Int. Cl.
*H01L 27/00*    (2006.01)
(52) U.S. Cl. .................................. 250/208.1
(58) Field of Classification Search ..............
250/370.06–370.14, 214 R, 214 A, 338.3,
250/214.1, 351, 330, 363.04; 257/E31.052,
257/E31.091, 53, 316
See application file for complete search history.

(56) References Cited

U.S. PATENT DOCUMENTS 5,742,058 A * 4/1998 Pantigny et al. ....... 250/370.08

FOREIGN PATENT DOCUMENTS

FR    A 2 736 782    4/1995

OTHER PUBLICATIONS

Patent Abstracts of Japan, "Image sensor signal read circuit", Dec. 1987.
Patent Abstracts of Japan, "Image sensor signal read circuit", Jul. 1987.

* cited by examiner

*Primary Examiner*—Tu T. Nguyen
(74) *Attorney, Agent, or Firm*—Thelen Reid & Priest LLP

(57) ABSTRACT

An image sensor with matrix readout includes a matrix of elementary photodetectors (P) connected through at least a bus (Bpel) to a remote integrator (I) which converts the signal of each elementary photodetector into a voltage. Provided between the end of the bus and the input of the integrator is an impedance matching device (D) with low output capacitance, delivering at its output, during the time for converting photodetector signal, a variation of charge which corresponds to an affine function of the charge present at the input of said matching device, wherein this charge variation is determined by:

$$\int_{t=0}^{t=Tconv} Iinj(t) \cdot dt = \int_{t=0}^{t=Tconv} Iint(t) \cdot dt$$

where Iinj is the instantaneous current of the bus, injected at the input of the impedance matching device, Iint is the instantaneous current at the input of the integrator and Tconv is the conversion time.

9 Claims, 9 Drawing Sheets

DEVICE FOR CONVERTING A PHOTOSIGNAL INTO A VOLTAGE IN IMAGE SENSORS WITH REMOTE INTEGRATORS

This application claims priority under 35 U.S.C. §§ 119 and/or 365 to 00 04562 filed in France on Apr. 10, 2000; the entire content of which is hereby incorporated by reference.

FIELD OF THE INVENTION

The invention relates to a device for converting a photosignal into a voltage in image sensors with remote integrators.

Generally, the invention finds applications in the field of imaging and notably, in image recording devices using matrix image sensors with remote integrators for converting electromagnetic radiations received by the photodetectors of image recording devices into electrical signals.

More particularly, the invention may be applied to imaging under low fluxes and/or with short integration times.

STATE OF THE ART

Presently, there are several types of image sensors for converting electromagnetic radiations into electrical signals. Generally, the image sensors include photodetectors which transform the electromagnetic radiations into photosignals. The latter are then transformed into electrical signals by means of a readout integrated circuit (also called RIC), which includes analog and/or digital functions.

In this type of sensors, the photodetectors may be produced within the readout integrated circuit itself; this is the case in particular when photodetectors are produced as photodiodes or photosensitive gates of CMOS transistors operating in the visible spectral band. This case is notably described in the article entitled "Comparison of passive and active pixel schemes for CMOS visible imagers" of KOZLOWSKI, KLEINHANS and LIU, SPIE Conference on Infrared Readout Electronics IV, Orlando, Fla., April 1998.

The photodetectors may also be directly produced on the readout circuit, as in the case when the photodetectors are resistive microbolometers operating in the infrared spectral band. They may also be produced according to a specific technological procedure; this is notably the case when the photodetectors are HgCdTe photodiodes. In this case, the photodetector matrix is made hybrid through microbeads on the readout integrated circuit. These two cases are described in the article entitled "Le développement des technologies infrarouge futures au LIR" of TISSOT and BERTRAND, Colloque international Optronique et Défense, December 1996, Montigny-le-Bretonneux, France.

For a better understanding of the field of the invention, the block diagram of a standard readout integrated circuit (RIC) is illustrated in FIG. 1.

In FIG. 1, elementary points (PEL) with reference P, each implemented in the pitches of the photodetectors and connected through buses, with reference Bpel, are illustrated in FIG. 1. The set of these elementary points and these Bpel buses forms an elementary point matrix, called the PEL matrix and referenced with MP.

Each PEL of matrix MP provides the coupling of the photodetector on the one hand, and a first conversion of the photosignal into an electrical quantity (current, charge or voltage), on the other hand.

Conventionally, each PEL row is connected at its end to the remote processing means, referenced as T.

These remote processing means T provide processing of the electrical signals obtained at the output of each row of matrix MP and, more specifically, the transformation of the signal delivered by each PEL of the matrix into multiplexable voltage samples to an output circuit. This output circuit consists of a multiplexer M, generally of the analog type, which receives signals issued from each remote processing means and provides multiplexing of the signals. If the readout integrated circuit RIC includes several PEL matrices, then the multiplexer(s) M provide multiplexing of the output of all the PEL matrices. The multiplexer(s) are themselves connected to output amplifier(s) A.

The remote processing means may be made up from an integrator, i.e., an amplifier with feedback through a condenser and a switch, which provides voltage conversion of the photosignal delivered by the PEL either as a current or as an electric charge.

There are two categories of readout integrated circuits (RIC) with remote processing: RICs for which the integrator of the remote processing unit proceeds with integration of the PEL's output current and RICs for which the integrator provides voltage conversion of the integrated charge in the PEL.

Both RIC types are described in the patent application FR-A-2 736 782 and are schematically illustrated in FIG. 2. It is seen in this FIG. 2, actually, that regardless of the type of RIC, the outputs of elementary points (PEL) of a same row are connected to the input of the integrator I, by means of the connection point BUS/PEL, referenced as X.

The effective fed-back capacitance at the input of the integrator I during the readout phase for each PEL, is then equal to the sum of the output capacitance of the addressed PEL (marked as P1), the output capacitances of the non-addressed PELs (marked as P2) and the capacitance of the $C_{x\text{-}bus}$ connection used for providing electrical continuity between the outputs of all the PELs and the input of the integrator I. In other words, the output capacitance of an addressed PEL corresponds to the capacitance of the addressing switch in the closed state and the output capacitance of a non-addressed PEL corresponds to the capacitance of the addressing switch in the open state.

In addition to the effective fed-back capacitances at the input of the integrator during the readout phase for each PEL, these remote integrators have significant conversion noises. These conversion noises, i.e. the noise at the output of the integrator, for zero input charge or current, originate from two independent sources: the intrinsic noise of the amplifier and the noise of the reference voltage source. In order to better understand the cause of such noises, the equivalent electrical diagram of a conventional remote integrator is illustrated in FIG. 3. In this diagram, Vref is the reference voltage of the DC voltage source, connected to the input e+ of an amplifier A; e− is the negative input of amplifier A to which the PEL bus (referenced as Bpel) is connected; Cconv is the conversion capacitance converted between the output s of amplifier A and the input e− of this amplifier; and Cbus_pel is the capacitance of the PEL bus.

Thus, as seen from the output of the integrator, the noise sources which have just been mentioned, are amplified by the gain in capacitance of the non-inverting type circuit which makes up the integrator. More specifically, the spectral density of the conversion noise voltage at the output of the integrator versus frequency is thus expressed as:

$$vbs\_conv(f) = \frac{Cbus\_pel + Cconv}{Cconv} \times \sqrt{(vb\_ampli(f))^2 + (vb\_ref(f))^2}$$

By integrating this equation in the frequency domain, the expression of the effective value of the output conversion noise voltage <vbbs_conv> is obtained versus the effective value of the input white noise voltage from the amplifier <vbb_ampli> and the $$\langle vbbs\_conv \rangle = \sqrt{\frac{Cbus\_pel + Cconv}{Cconv}} \times \sqrt{\langle vbb\_ampli \rangle^2 + \langle vbb\_ref \rangle^2}$$

effective value of the white noise from the reference voltage <vbb_ref>:

This last expression shows that the conversion noise of a remote integrator is an increasing function of the amplifier's noise, of the reference voltage's noise, of the PEL bus capacitance and of the reciprocal of the conversion condenser's capacitance.

The relationships which account for the low frequency noise components, characteristic of CMOS amplifiers and the real transfer function of the amplifier, are relatively complex; so for the sake of simplicity, the very low frequency components have been assimilated to quasi-continuous levels. The latter are therefore amplified by the gain of the non-inverting circuit. Thus, the interval for estimating the conversion noise at the output of a conventional remote integrator is the following:

$$\left( \frac{Cbus\_pel + Cconv}{Cconv} \right)^{0.5}$$

$$\left| brutblanc \leq \frac{\langle vbbs\_conv \rangle}{\sqrt{\langle vbb\_ampli \rangle^2 + \langle vbb\_ref \rangle^2}} \leq \left( \frac{cbus\_pel + Cconv}{Cconv} \right)^{1.0} \right|_{1/f \text{ noise}}$$

This expression shows the relationships between the contributors to conversion noise and the sensitivity of conversion noise to these contributors.

Now, in a standard remote integrator sensor, for a given sensor format or for a given PEL pitch, if the number of PELs is increased, then the PEL bus capacitance increases. And, from the above formula, if the pitch of the PEL and the format of the sensor increase, then conversion noise also increases as it depends on the capacitance of the PEL bus.

On the other hand, as the requirements relative to the sensor are increasingly numerous, an increasingly larger number of functions have to be integrated into the midst of a PEL. Thus, the pattern of the extra functional units in the reduced surface of a PEL increases intra-PEL integration density and the number of inputs and outputs of the PEL. The routing constraints of the intra-PEL and inter-PEL interconnections increase capacitive couplings with the PEL bus (stray condensers of the overlapping interconnections and influence coupling between parallel conductors). These stray capacitances increase the PEL bus capacitance and the conversion noise consequently increases.

On the other hand, the output capacitance of a PEL cannot always be minimized for the purpose of reducing the conversion noise. Actually, reducing the resistance of the addressing switch in the conducting state requires, for example, increasing the width of the channel of the addressing TMOS transistor. Now, this has the effect of increasing its gate-source capacitance, as well as the capacitance of its junction connected to the PEL bus. Also, when the addressing switch is made by putting a NMOS transistor and a PMOS transistor in parallel, the output capacitance of the PEL increases through the same mechanism as described earlier. Also, in both of these cases, the PEL's output capacitance increases, regardless of whether it is addressed or not addressed. And the capacitance of the PEL bus consequently increases.

On the other hand, in certain cases, it is necessary to increase the voltage response, obtained at the output of the remote integrator. For example, this is the case, when the intention is to use a low value conversion capacitance for converting a low value photocharge into a voltage, in an optimal way, or when the intention is to integrate a photocurrent for a reduced period, or even when the intention is to integrate a low input current. This is also the case when the intention is to reduce the requirements on the input noise of analog units implemented downstream from the remote integrator or to increase noise immunity of the output signal from the RIC or even to reduce the complexity of output signal acquisition chains, etc. . . In all these cases, the voltage response may be increased by reducing the conversion condenser's capacitance, but this induces, according to the explanation given earlier, an increase in conversion noise.

On the other hand, the formula which gives the spectral density $V_{bs-conv}$, shows that the reference voltage noise is amplified by an increasing function of the Cbus_pel/Cconv ratio. Strong constraints for obtaining low conversion noise, are transferred to the design of the power supply when the Cbus_pel/Cconv ratio is unfavorable. In addition to the fact that a very low noise power supply must be created, its "routing" should be subject to particular precautions if this level of noise is to be guaranteed at the input e+ of all the remote integrators of the readout integrated circuit.

This formula also shows that the intrinsic noise of the amplifier A of the remote integrator is amplified by the increasing function of the Cbus_pel/Cconv ratio. Strong constraints for obtaining low conversion noise, are transferred to the design of the amplifier and of its stimuli when the Cbus_pel/Cconv ratio is unfavorable, since action is required at several levels, namely: reduce the noise component due to the TMOS transistor of the amplifier, power the amplifier with low noise power supplies and select an amplifier circuit which exhibits very good power supply rejection. Now, this is all the more difficult to achieve as the pitch of the PEL is reduced, because a lesser number of degrees of freedom is then available for optimizing the TMOS transistor geometries and their positioning.

DESCRIPTION OF THE INVENTION

The object of the invention is to find a remedy to the drawbacks of the image sensors with remote integrators, as described earlier. For this purpose, it provides a device for voltage conversion of a photosignal, which may be used in image sensors with remote integrators, and which exhibits reduced conversion noise.

According to the invention, the conversion noise may be reduced if the effective fed-back capacitance at the input of the remote integrator is reduced significantly, without altering the voltage transfer function for the photosignal. This is achieved by inserting an impedance matching device with low output capacitance, between the end of the PEL bus (used for multiplexing the outputs of the elementary points of a same row) and the input of the integrator.

More specifically, the invention relates to an image sensor with matrix readout including a matrix of elementary photodetectors connected through at least a PEL bus to a remote integrator converting the signal of each elementary photodetector into a voltage, characterized in that, it includes between the end of the PEL bus and the input of the integrator, an impedance matching device with low output capacitance, delivering at its output, during the conversion time for a signal from a photodetector, a charge variation which corresponds to an affine function (i.e. a monotonous variation of the input function) of the charge present at the input of said matching device.

The charge variation may be determined by:

$$\int_{t=0}^{t=T_{conv}} Iinj(t) \cdot dt = \int_{t=0}^{t=T_{conv}} Iint(t) \cdot dt$$

wherein Iinj is the instantaneous bus current injected at the input of the matching device, Iint is the instantaneous current at the output of the matching device and Tconv is the conversion time.

Advantageously, the impedance matching device is connected as close as possible to the input of the integrator.

Preferably, the impedance matching device is a common-gate TMOS transistor mounted on the input of the integrator.

According to an embodiment of the invention, the impedance matching device includes a common-gate TMOS transistor associated with a feedback amplifier.

According to another embodiment, the impedance matching device includes two transistors and two voltage sources configured as a current mirror.

SHORT DESCRIPTION OF THE FIGURES

Figure 6:
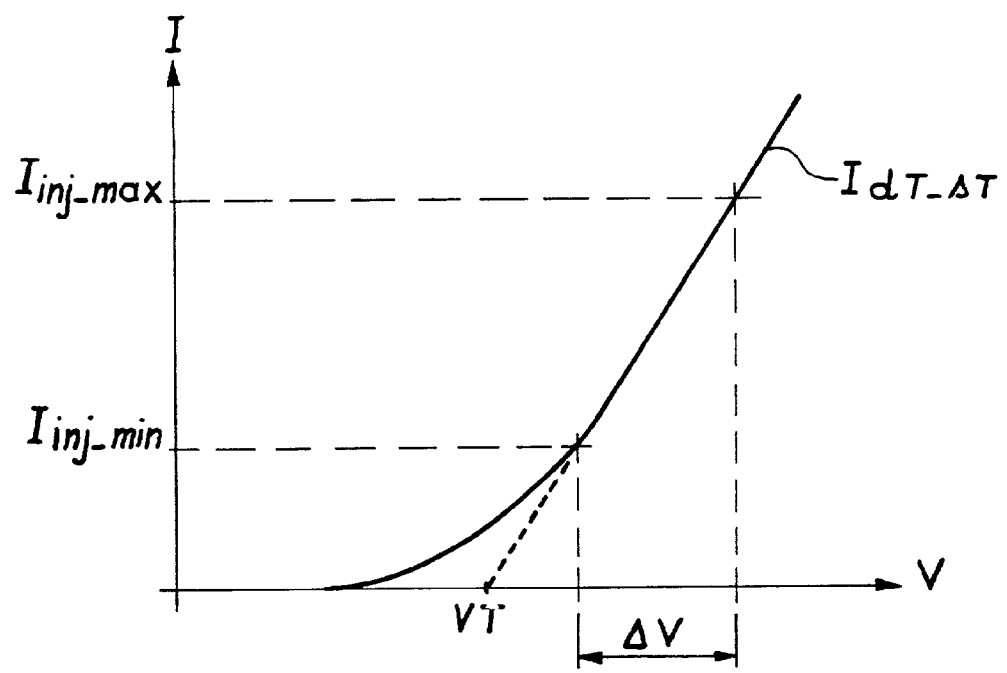
Figure 7:
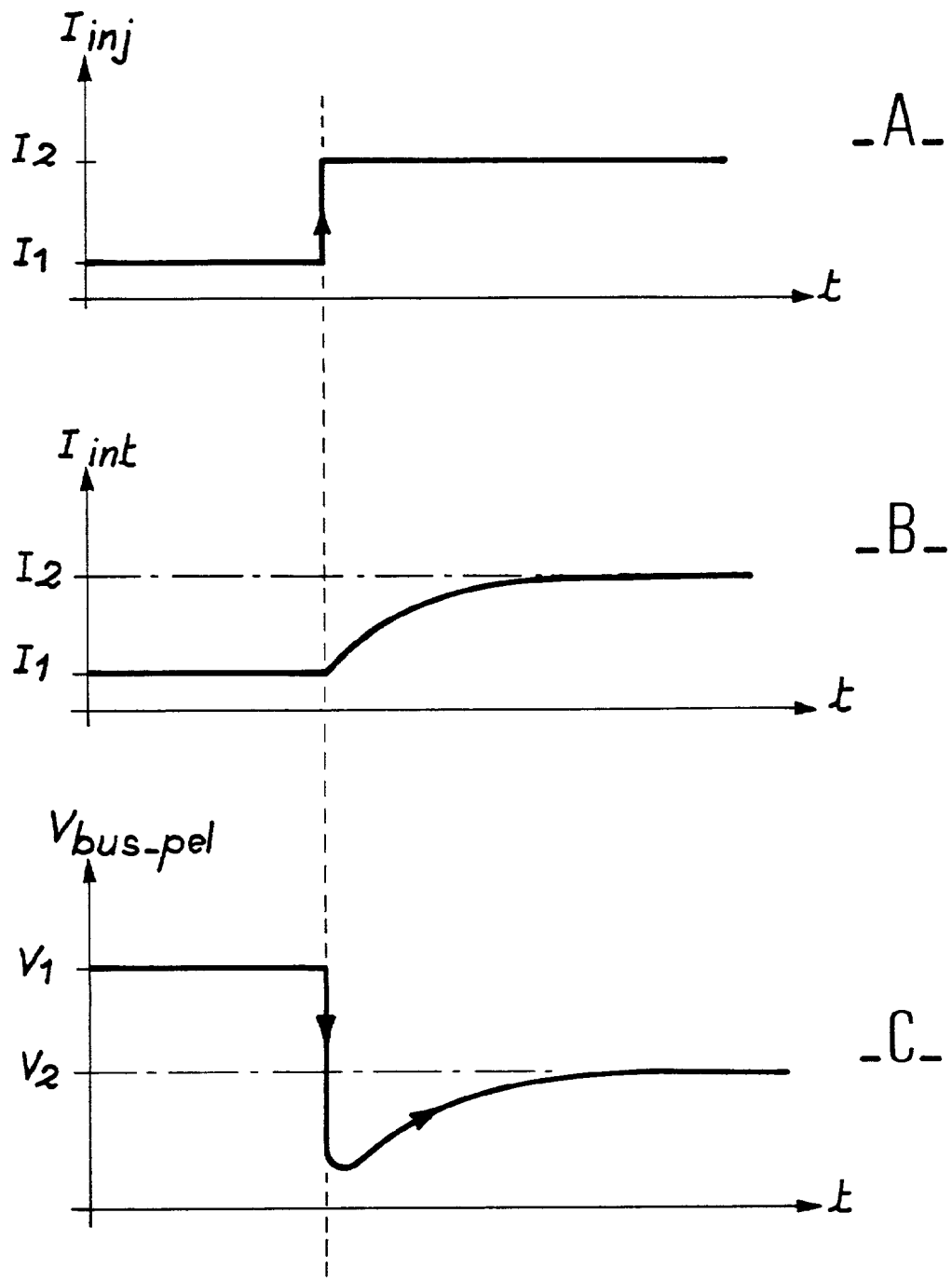
Figure 8:
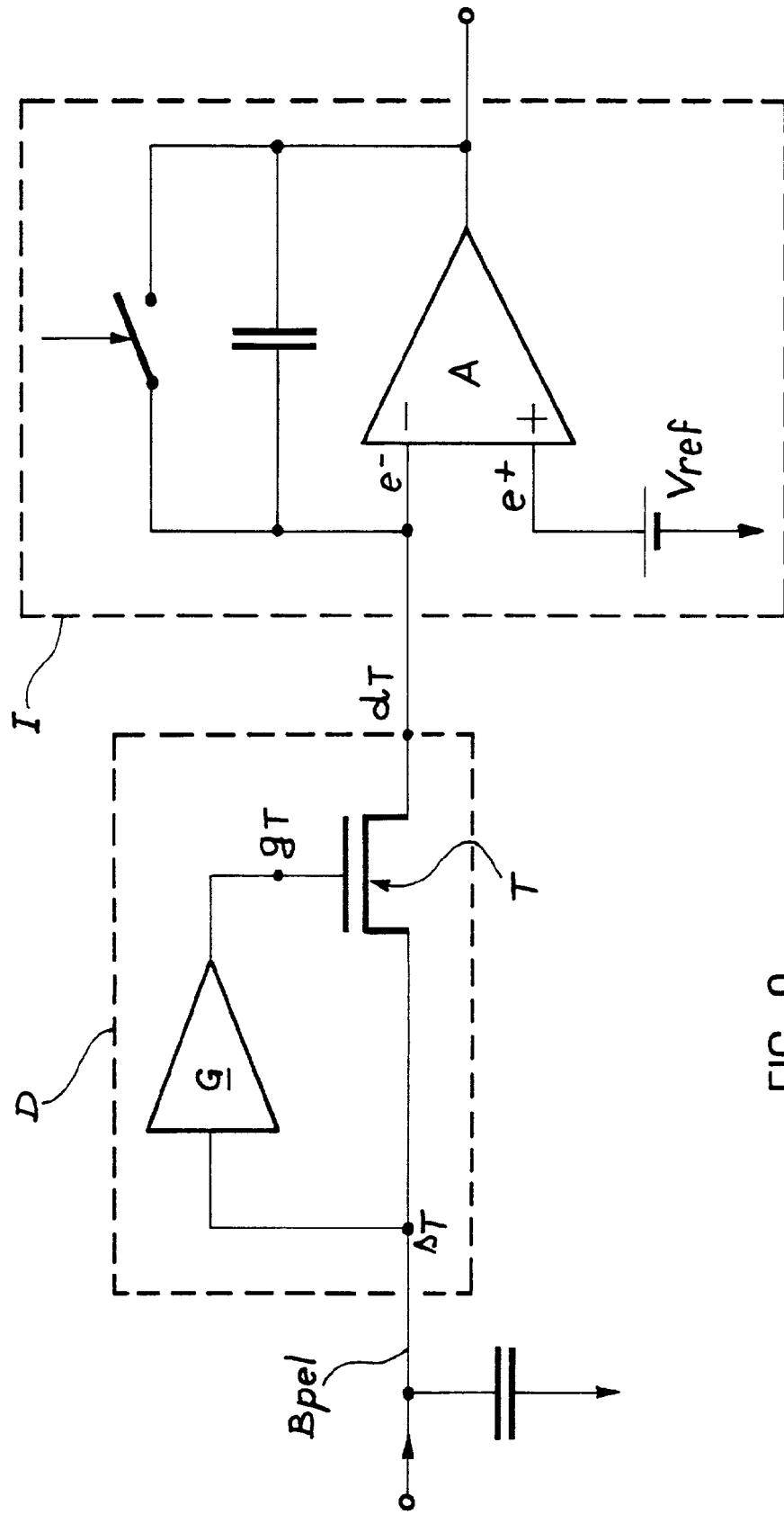
Figure 9:
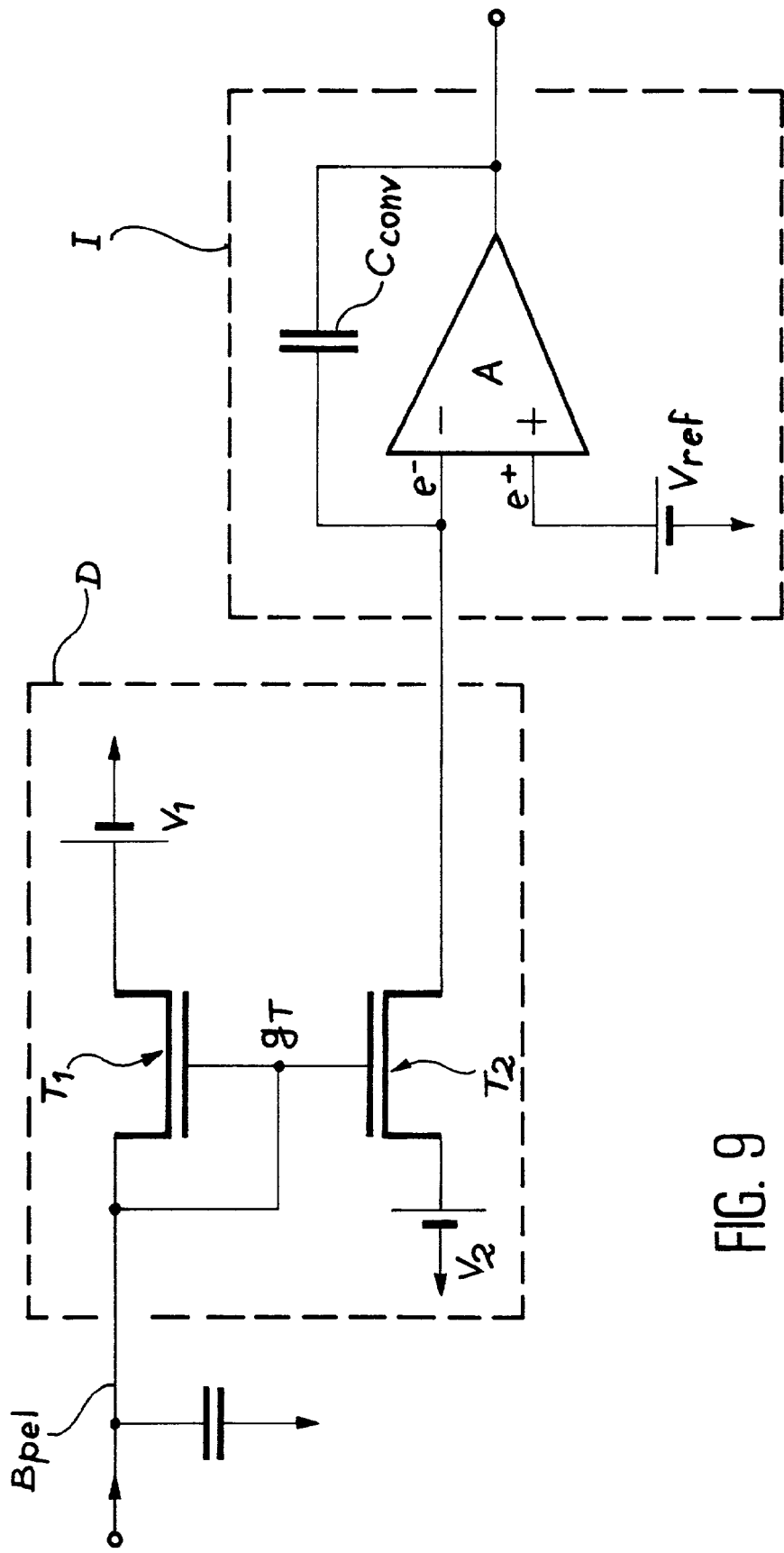

FIG. 6 schematically shows the plot of the variation of the PEL bus potential versus the injected current into the TMOS transistor;

FIG. 7 schematically shows the response of the TMOS transistor to a current step;

FIG. 8 shows the electrical diagram of an embodiment of the device of the invention; and FIG. 9 shows the electrical diagram of another embodiment of the device of the invention.

DESCRIPTION OF THE EMBODIMENTS OF THE INVENTION

The invention relates to an image sensor with a remote integrator, wherein the conversion noise is reduced. This reduction in conversion noise is achieved by introducing, between the end of the PEL bus and the input of the remote integrator, an impedance matching device with low output capacitance, which enables the effective capacitance at the input of the remote integrator to be reduced significantly, without altering the voltage transfer function for the photosignal.

Advantageously, the impedance matching device is inserted as close as possible to the input of the remote integrator, which provides the best possible performance, i.e. minimization of the capacitance at the output of the integrator. Ideally, this impedance matching device should exhibit the following features:

it should have low output capacitance Cs as compared with the capacitance of the PEL bus; and its output should deliver, at the input of the integrator, an instantaneous current strictly equal to the instantaneous current injected at its input.

Now, this last feature is too restrictive for an easy implementation of the device. The invention therefore provides selection of an impedance matching device which maintains conservation of charge between its input and its output in order not to alter the voltage conversion process of the photosignal delivered by the PEL.

In other words, any impedance matching device may be used from the moment that it has low output capacitance, and that it delivers on its electrical output node, a charge variation strictly equal to that developed on its input node, for a time Tconv equal to the time required for converting the photosignal into a voltage.

This charge variation is an affine function of the variation of the charge injected at its input; it is given by the expression:

$$\int_{t=0}^{t=T_{conv}} Iinj(t) \cdot dt = \int_{t=0}^{t=T_{conv}} Iint(t) \cdot dt$$

where Iint(t) is the instantaneous current at the input of the integrator.

Figure 4:
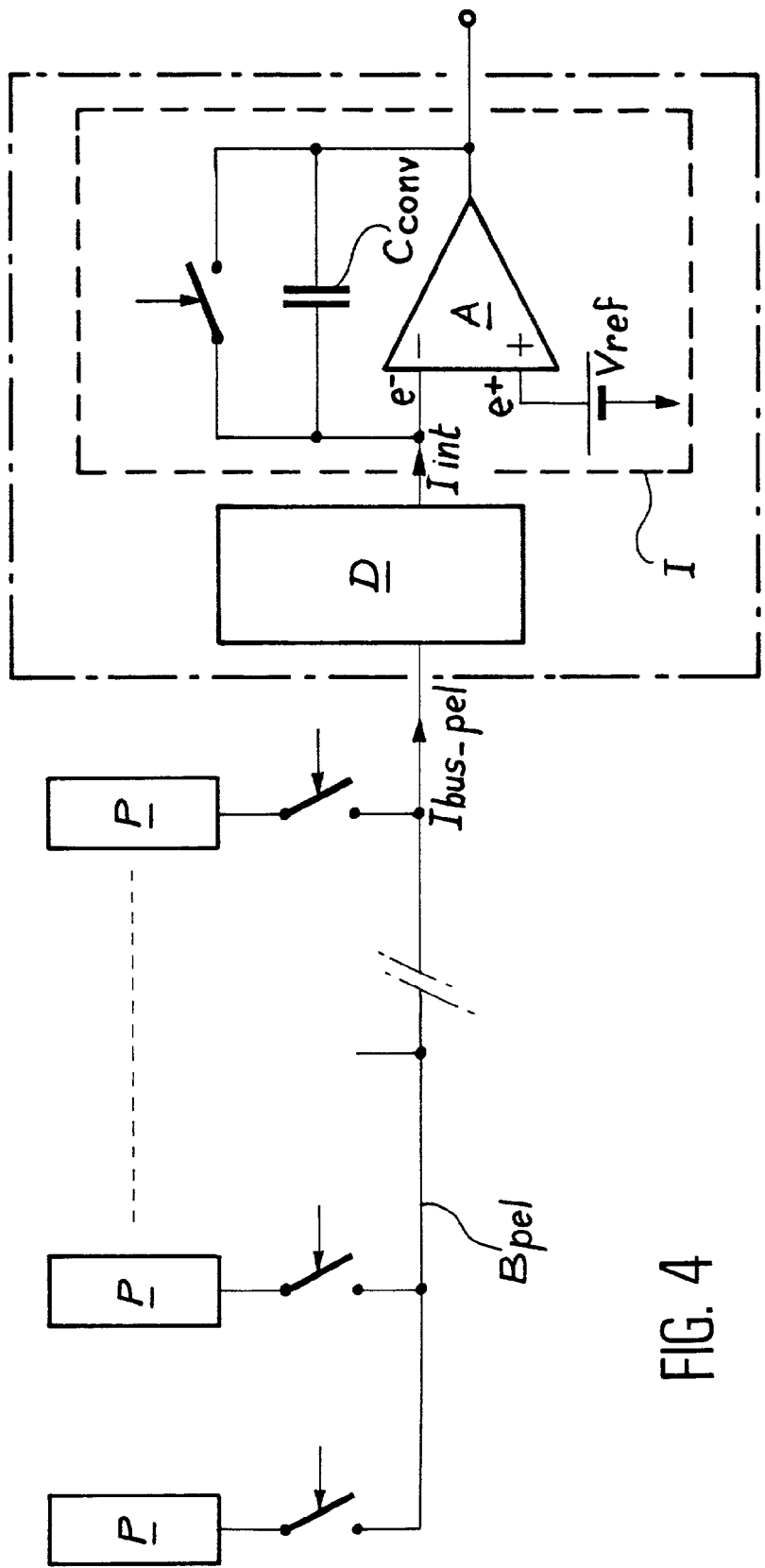
FIG. 4 shows the block diagram of a readout integrated circuit according to the invention.

The readout integrated circuit of an image sensor with remote integrator according to the invention is illustrated schematically in FIG. 4. As in the previous figures, the elementary points are referenced as P and the PEL bus connecting each row of elementary points P is referenced as Bpel. This Bpel bus is connected at one of its ends (called "end" in the following), to an impedance matching device D, itself connected to the input of an integrator I.

Figure 1:
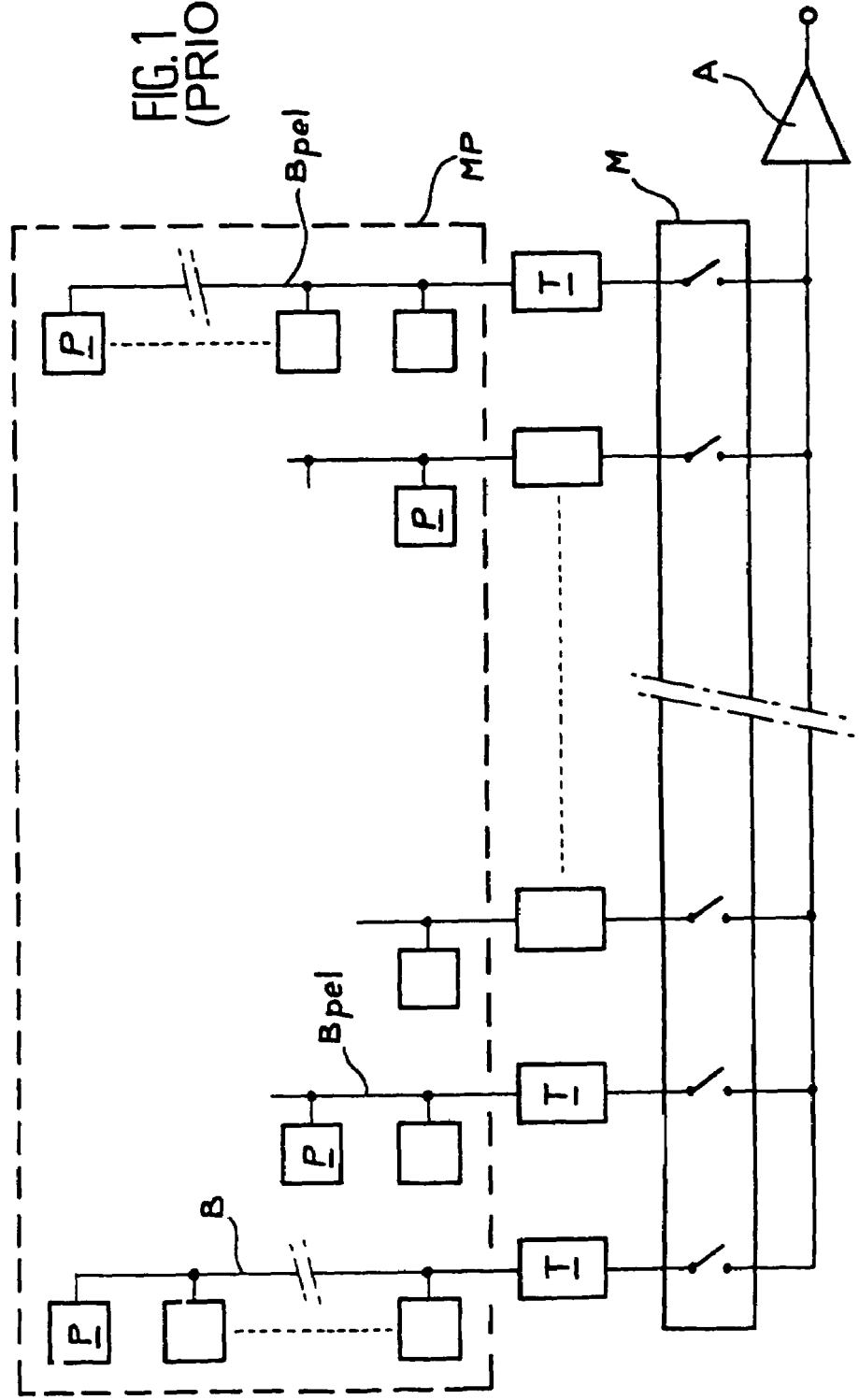
FIG. 1 shows the block diagram of a standard readout integrated circuit.
Figure 2:
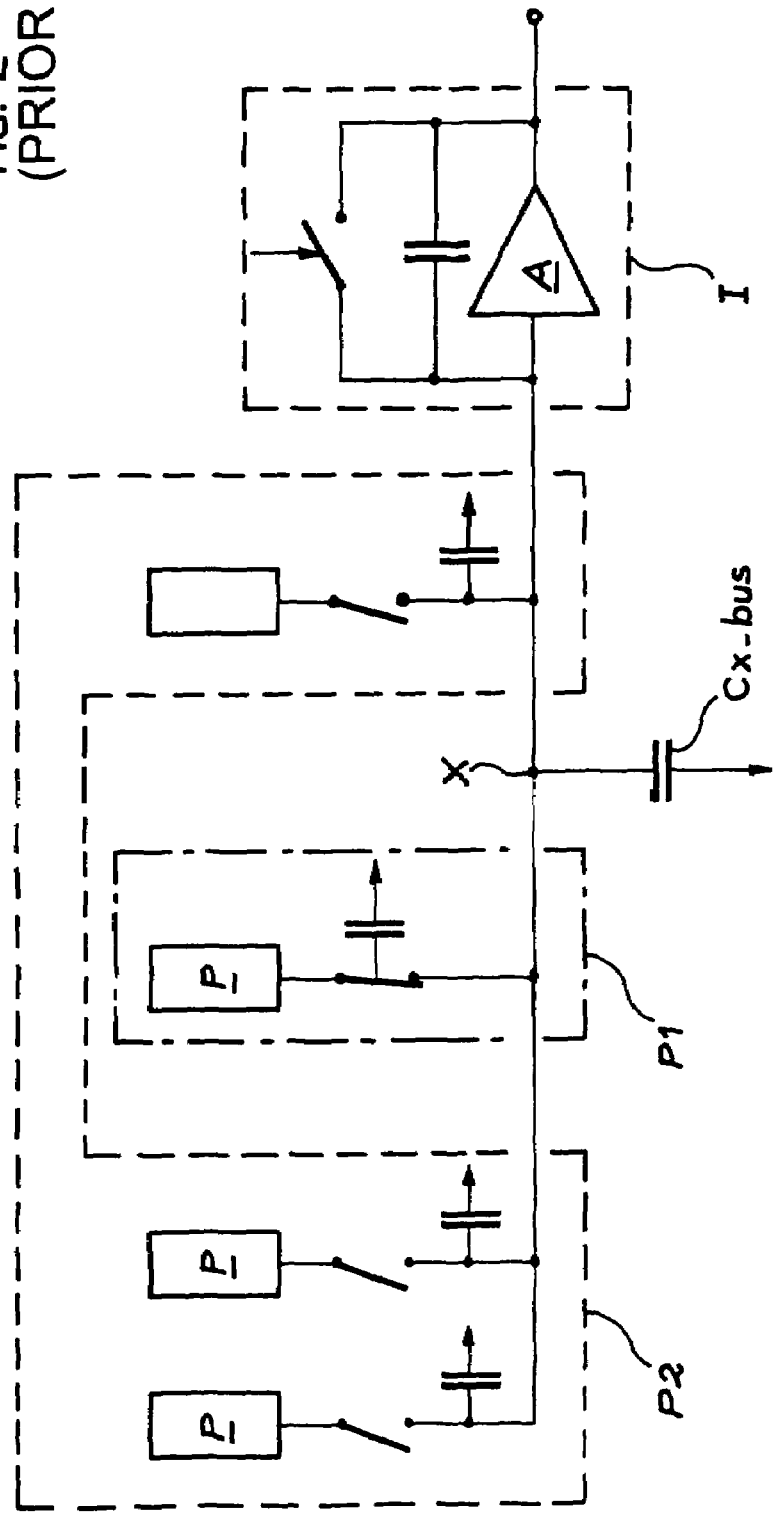
FIG. 2 shows the electrical diagram for a PEL row in a standard RIC.
Figure 3:
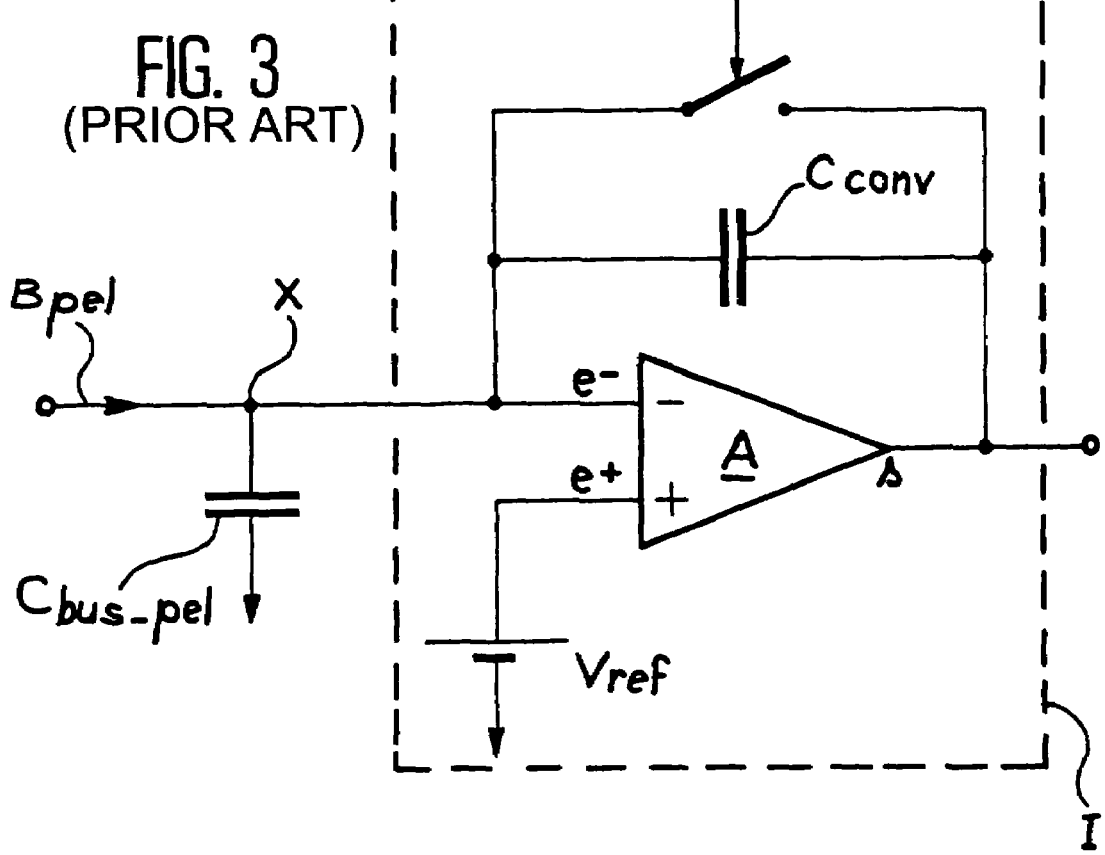
FIG. 3 shows the electrical diagram of a standard remote integrator.

The integrator I may be the same as the one used in the prior art and shown in FIG. 3.

The impedance matching device D may be realized according to several different embodiments.

According to one of these embodiments, the impedance matching device is embodied by a common-gate TMOS transistor mounted on the integrator. This embodiment is shown in FIG. 5.

Figure 5:
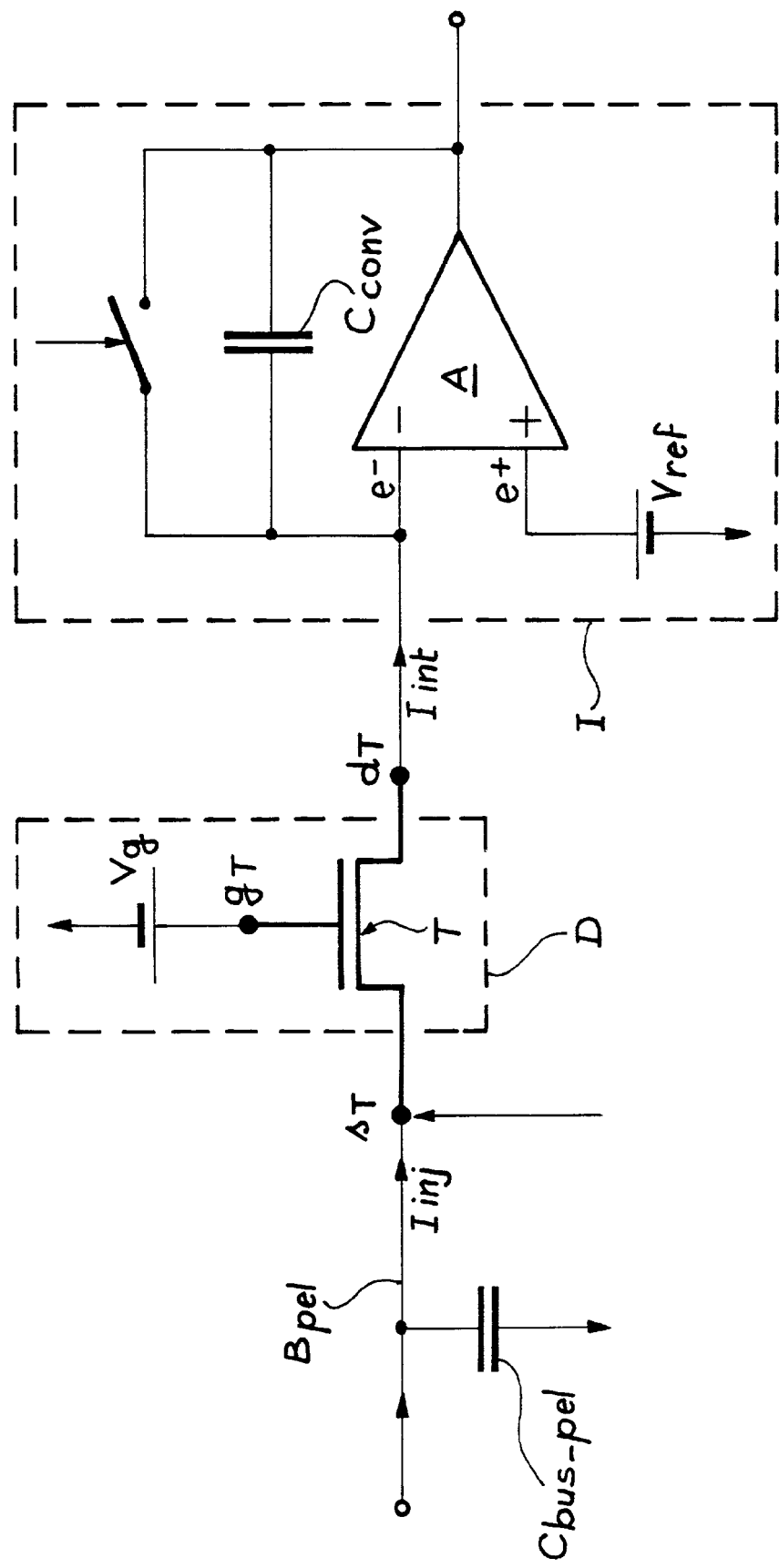
FIG. 5 shows the electrical diagram of a preferred embodiment of the invention.

In this FIG. 5, the TMOS transistor is referenced as T with its gate $g_T$, its source $s_T$, and its drain $d_T$. The source $s_T$ of transistor T is connected to the end of the PEL bus; the drain $d_T$ of transistor T is connected to the input e– of amplifier A, in other words, at the input of the integrator I; the gate $g_T$ of transistor T is connected to a voltage source Vg.

According to an embodiment, transistor T may be a NMOS transistor, notably if the intention is to integrate the photocurrent delivered by the N type photodiodes on substrate P or even from a resistive microbolometer.

According to another embodiment, the transistor T may be of the PMOS type in order to process the photocurrent delivered by type P photodiodes on a substrate N or even from a resistive microbolometer.

The amplifier A, shown in this FIG. 5, includes a differential input (e−; e+); the invention may however be used with other types of charge amplifiers.

The quiescent point of transistor T is adjusted so that it delivers, at the input of amplifier A, i.e. on its drain $d_T$, a current equal to the Iinj current injected into its source $s_T$, by the Bpel bus.

The drain $d_T$ potential of the transistor is equal to Vref, which is the virtual ground of the differential amplifier A. The voltage applied on the gate of transistor T is adjusted so that the transistor is in a saturation state.

Transistor T thus has a very large drain-source resistance; furthermore its drain $d_T$ current is then equal to the current injected into the source $s_T$ of the transistor.

On the other end, the output capacitance of transistor T is equal to the sum of the gate-drain capacitance of a TMOS transistor in a saturation state and of the drain junction capacitance. This capacitance is of the order of magnitude of the output capacitance of one single PEL. It is therefore much less than the capacitance of the PEL bus. In this embodiment, voltages Vg and Vref are optimized in order to obtain operation in a saturation state over the whole input current range, as the potential of the PEL bus should be allowed to vary, in order that the transistor T may develop a gate-source voltage compatible with the injected current intensity. In this way, the voltage response of the integrator I associated with the impedance matching device D, to a constant current drive of the PEL bus, is identical to that of a standard remote integrator.

A plot showing the variation of the PEL bus potential versus the current injected into transistor T is illustrated in FIG. 6.

In this figure, plot $Id_T$-$s_T$ shows the drain-source current of transistor T; the Iinj-max and Iinj-min values are the maximum and minimum values of the injected current on the source $s_T$ of transistor T, respectively, and the $V_T$ value represents the threshold voltage of transistor T.

On the other hand, it should be noted that the PEL of a sensor delivers photosignals with levels which vary independently of one another because the image pixels with which they are associated, are generally not correlated. Therefore, in the device of the invention, the response of the integrator to a current pulse of variable amplitude and duration should be identical to that of a standard remote integrator. To show that this is the case, different responses of the integrator are shown in FIG. 7.

Part A of FIG. 7 shows the response of the integrator to the injection of a current step Iinj (I1, I2) on the PEL bus. Part B of FIG. 7 shows the fact that the injected current Iint into the integrator follows the variation of current Iinj with a finite response time, this is obtained either by resolving KIRCHOFF's equations or by performing suitable electrical simulations. Part C of FIG. 7 shows the time course of the PEL bus potential between the two asymptotical values V1 and V2 which are determined by means of the current-voltage characteristic of FIG. 6. The time constant τ, which givens this transient state, is given by formula:

$$\tau = gm/Cbus\_pel$$

wherein gm is the transconductance of transistor T.

The integrated current in the charge amplifier A is therefore not strictly equal to that injected on the PEL bus, but the difference between the output levels of both devices becomes insignificant from the moment that the conversion time Tconv is greater than T, which is the case in most sensors and in particular in the following cases:

when the capacitance of the PEL bus is capable of providing charges during the transition of currents much more rapidly than the transistor T on the rising edge of current Iinj;

when there is no loss of charge on the PEL bus, i.e. when the TMOS transistors' junctions, connected to the PEL bus, remain inverted during the whole conversion cycle;

when transistor T sets its source to its final potential V2, with its own time constant (see FIG. 7c showing the response to a current step).

These results may be generalized to the response to a current pulse delivered by a PEL on the PEL bus. In the case of a very short duration pulse, relatively to τ, the equivalent photocharge of the PEL is first of all temporarily stored in the capacitance of the PEL bus, then it is entirely restored on the drain of transistor T. Once again, the junctions connected to the PEL bus remain inverted during the whole voltage conversion process of the information delivered by the PEL.

So, although at any time t, the device of the invention is unable to deliver an output current equal to it input current, it maintains the charge between its input and its output, from the moment that the conversion time is greater than the response time of the device and that the variation induced on the PEL bus by the current pulse delivered by each PEL does not cause the junctions which are connected to it, to become inverted.

Furthermore, as shown earlier, the output capacitance of this device is much less than that of the PEL bus, of a readout integrated circuit in a matrix sensor.

Also, the impedance matching device made by means of a common-gate mounted TMOS transistor is thus in accordance with the features listed earlier and required for proper operation of an image sensor, i.e. low output capacitance and delivery on its output node of a variation of charge strictly equal to that developed on the input location.

Because of these features, conversion noise obtained at the output of the remote integrator associated with an impedance matching device according to the invention, is significantly reduced as compared with that of a standard remote integrator, since the non-inverting circuit gain is, in the case of a differential input integrator:

$$\frac{S}{Eplus} = \frac{Cmoins + Cconv}{Cconv}$$

wherein Cmoins is the sum of the output capacitance of the impedance matching device and of the capacitance of the e− input of amplifier A. With this relationship, it is possible to calculate the reduction factor for the effective value of the conversion noise, between a conventional remote integrator and a remote integrator according to the invention (i.e. remote integrator+impedance matching device), in the case of white noise:

$$\frac{\langle vbbs\_conv \rangle_{conventional}}{\langle vbbs\_conv \rangle_{enhanced}} = \frac{\sqrt{\dfrac{Cbus\_pel + Cconv}{Cconv}}}{\sqrt{\dfrac{Cmoins + Cconv}{Cconv}}} = \sqrt{\dfrac{Cbus\_pel + Cconv}{Cmoins + Cconv}}$$

For example, in the case of an infrared quantum sensor with a 512×512 PEL format with a pitch of 20 μm, dedicated to imaging applications under a low input flux, the order of magnitude of Cbus_pel is of 2.0 pF and that of Cconv is about 0.1 pF. By using a common-gate TMOS as impedance matching device, the capacitance Cmoins may be reduced to 0.1 pF. Injection of these values into the above formula shows that the conversion noise of the remote integrator of the invention is three times less than that of the standard remote integrator.

Accordingly, the invention is able to significantly reduce conversion noise in the case of white noise. It is also shown through an identical argument, that the low frequency components of the amplifier's noise and that of the reference voltage are attenuated through this device just as significantly.

The impedance matching device may be made according to other embodiments. For example, it may be made by means of a common-gate TMOS transistor with a feedback amplifier. Actually, it is possible to further improve certain features of the first embodiment by feedback of the source of transistor T through an amplifier G. In this case, amplifier G is mounted between the gate $g_T$ of transistor T and source $s_T$ of transistor T, as shown in FIG. 8. Introduction of this feedback has the effect of increasing the input transconductance of transistor T, which causes a reduction in the response time to a current step.

Such a device may be used, e.g. in readout integrated circuits where conditions on the conversion times (i.e. the readout time for the information delivered on a PEL) and on the voltage response of the remote integrator require reduction in the response time of the impedance matching device D located upstream from the integrator.

The impedance matching device may also be made by means of a current mirror, as illustrated in FIG. 9.

In this embodiment, the impedance matching device D is made by means of two transistors T1 and T2 each associated with a voltage source V1 and V2 and connected with one another through their gate $g_T$ in order to form a current mirror. Thus, the device of the invention delivers at the output, a current Iint which is equal to its input current Iinj multiplied by an amplification factor which depends on the geometry ratio of TMOS transistors T1 and T2 and on voltages V1 and V2. The current gain may be less or greater than one.

The device according to the invention, made according to this embodiment, may be used in applications where setting the current delivered by the PEL bus back into the input range of the charge amplifier proves to be necessary.

With the image sensor of the invention, less conversion noise may therefore be obtained, than that from a standard sensor. The input dynamical range for sensor flux is thus increased, whereby the effective input noise of the readout integrator circuit is reduced.

With the device of the invention, a better voltage response at the output of the remote integrator may further be obtained, by reducing the conversion capacitance and reducing of the conversion noise.

These enhancements enable remote integrator RICs to be used in novel applications and for example, in low flux and/or low integration time imaging with quantum sensors, for which the equivalent photocharge is low. Such RICs may also be used in resistive microbolometer thermal sensors with remote current baseline-clipping.

More generally, the impedance matching devices according to the invention may also be associated with multirange remote integrators (charge amplifiers having several selectable condensers in its feedback loop), in order to perform a conversion adapted to the input photosignal level.

Furthermore, for constant conversion noises and for a given format and PEL pitch, the device of the invention may adapt to a noise level on the reference voltage Vref larger than that of a standard integrator. Under these same conditions, it may also adapt to an input noise level of the charge amplifier greater than that of a standard remote integrator.

Moreover, with the device of the invention, the conversion noise no longer depends on the capacitance of the PEL bus. It is therefore possible to increase this capacitance without increasing the conversion noise. This opens a great number of possibilities, such as increasing the format of the sensor, increasing the pitch of the PEL, the possibility of increasing the number of multiplexed rows to a same integrator, increasing the complexity of the PEL or even increasing the number of inputs and outputs of the PEL.

The invention claimed is:

1. An image sensor with matrix readout including a matrix of elementary photodetectors (P) connected through at least a bus (Bpel) to a remote integrator (I) converting the signal of each elementary photodetector into a voltage, characterized in that it includes, between the end of the bus and the input of the integrator, an impedance matching device (D) delivering at its output, during the time required for converting a photodetector signal, a variation of charge which corresponds to an affine function of the charge present at the input of said matching device, wherein this variation of charge is determined by:

$$\int_{t=0}^{t=Tconv} Iinj(t) \cdot dt = \int_{t=0}^{t=Tconv} Iint(t) \cdot dt$$

wherein Iinj is the instantaneous current of the bus, injected at the input of the impedance matching device, Iint is the instantaneous current at the input of the integrator and Tconv is the conversion time.

2. The image sensor according to claim 1, characterized in that the impedance matching device (D) has a low output capacitance.

3. The image sensor according to claim 1, characterized in that the impedance matching device is connected as close as possible to the input of the integrator.

4. The image sensor according to claim 3, characterized in that the impedance matching device includes a common-gate TMOS transistor (T) mounted on the input of the integrator.

5. The image sensor according to claim 1, characterized in that the impedance matching device includes a common-gate TMOS transistor (T) mounted on the input of the integrator.

6. The image sensor according to claim 5, characterized in that the impedance matching device includes a common-gate TMOS transistor (T) associated with a feedback aim-plifier (G).

7. The image sensor according to claim 1, characterized in that the impedance matching device includes a common-gate TMOS transistor (T) associated with a feedback amplifier (G).

8. The image sensor according to claim 1, characterized in that the impedance matching device includes two transistors (T1, T2) and two voltage sources (V1, V2) mounted as a current mirror.

9. The image sensor according to claim 2, characterized in that the impedance matching device is connected as close as possible to the input of the integrator.

* * * * *